UNITED STATES PATENT OFFICE.

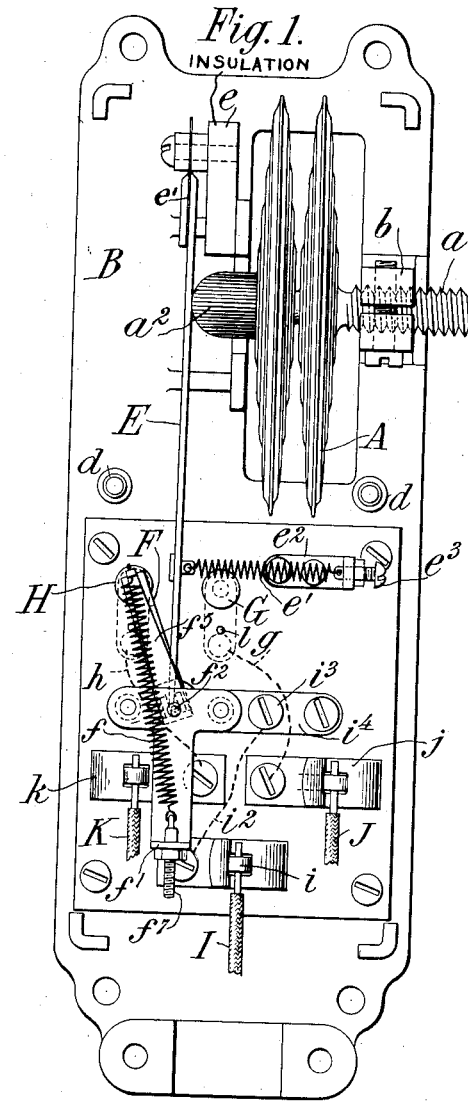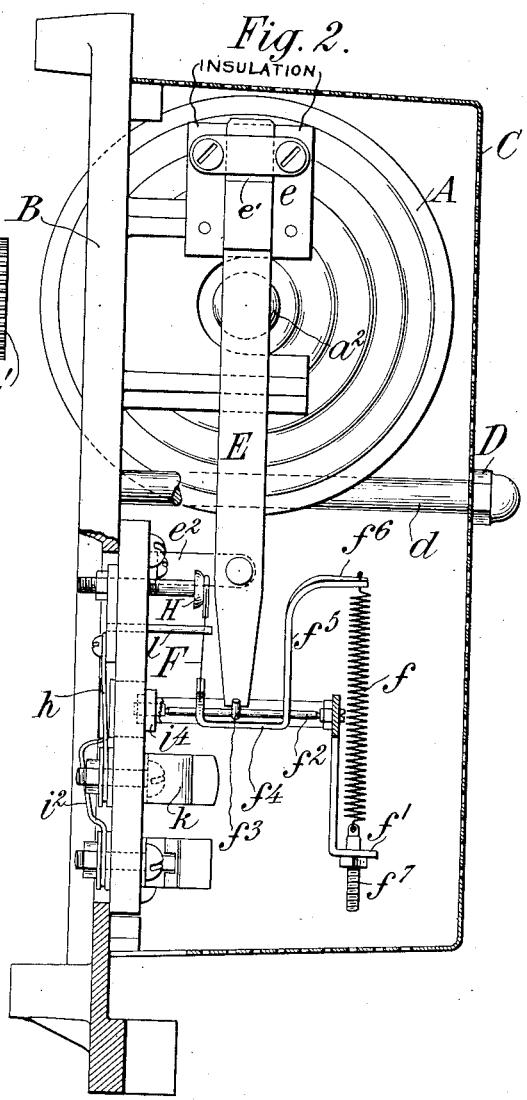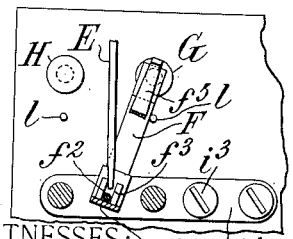

FREDERICK T. KITCHEN, OF WEST NEW BRIGHTON, NEW YORK, ASSIGNOR TO GOLD CAR HEATING & LIGHTING COMPANY, OF NEW YORK, N. Y., A CORPORATION OF NEW YORK.

CONTROLLER FOR HEATING SYSTEMS.

1,214,323.   Specification of Letters Patent.   Patented Jan. 30, 1917.

Application filed October 3, 1913.  Serial No. 793,167.

*To all whom it may concern:*

Be it known that I, FREDERICK T. KITCHEN, a citizen of the United States, residing in West New Brighton, Richmond county, and State of New York, have invented certain new and useful Improvements in Controllers for Heating Systems, of which the following is a specification.

My invention relates to a device for automatically controlling the supply of heating fluid to a heating system, and is applicable for use with various kinds of heating systems, steam, electric, etc. It may be used in such systems in heating houses and also in heating railway passenger cars, and has properties which make it particularly desirable for the latter use.

My invention provides means whereby a thermostat is caused to operate an electric switch for controlling the supply of heat.

A desirable object accomplished by my invention is to produce a wide break of the electric switch whereby the same may be employed to directly control the heating circuit.

A desirable form in which the invention may be embodied is illustrated in the accompanying drawing, wherein—

Figure 1 is a plan view of my improved controller with the casing or cover removed; Fig. 2 is a side elevation, partly in section, showing the cover in place. Fig. 3 is a detail cross-section illustrating the connection between the operating arm and the switch.

In accordance with my invention the supply of heating fluid to the room, railway or other apartment to be heated is controlled by the temperature of the said apartment whereby as the said temperature increases the supply of heating fluid is decreased or shut off. I therefore provide operating means for my controlling device consisting of a thermostat, and the said thermostat may be of any one of the numerous varieties well known and employed for similar purposes. Preferably I employ an expansible vessel A which is double, as illustrated, to wit, it contains two vessels which are joined at their centers so that they shall open one into the other and which vessels contain a small amount of volatile fluid. The fluid employed by me for this purpose forms no part of the present invention and any one of a number of fluids well known for this purpose may be employed, such as alcohol, ethyl-chlorid, or other fluid. The expansible vessel is well known and is adapted to be expanded when the contained volatile fluid is expanded by the requisite temperature and such vessel will be contracted by the contraction of the said fluid. The expanded volatile fluid is very elastic under compression and upon its expansion it is compressed by the resistance of the switch to the initial movement, and this elasticity is made use of in the operation of my device, as hereafter explained, not only to constitute a motor for moving the switch against resistance, but by its elasticity to store up power which is used to increase the movement of the switch when needed.

The expansible vessel A is mounted upon the base or back B and this carries a foraminous cover C which is preferably made removable and may be held in place by any suitable means, as for instance, by nuts D which screw on posts *d*. The thermostat A is adapted to control an electrical switch member which when moved in one direction will close an electric circuit, whereby the supply of heating fluid will be cut off, or when moved in the other direction will open said circuit, and may if desired also close another circuit whereby the supply of heating fluid will be turned on. It is obvious that the invention is equally applicable for use in an electric heating system wherein the device will be employed to open or close an electric switch, for instance, for controlling the heating circuit, or it may be applied to a steam heating system wherein the electric circuits will control means for opening or closing a steam valve.

The improved controlling device invented by me may be located in a shunt which includes means for controlling the supply of heating fluid, or it may be located directly in the main heating circuit so that the heating current passes directly through my improved switch. It may be employed in such heating circuit without a relay or other device, by reason of the wide break whereby the formation of arms is prevented and also the particular snap action provided by the combination of the elastic switch-actuating-means (whereby the actuating energy is accumulated) and the resisting switch upon which the accumulated energy of the actuating means is suddenly operative on the removal of the resistance to throw the switch.

In previous devices known to me for the control of heating circuits, a narrow break of the switch is produced and this fact renders the device inapplicable for use in directly controlling the heating circuit in places where considerable vibration is experienced, as for instance on railway cars, steamships, etc., particularly the former, owing to the liability of the chattering of the switch producing an arc between it and the nearest contact point. According to my invention, however, a very wide break of the switch member is produced and the same is positively held at its extreme position. Therefore, the means for holding the switch at its extreme position prevent chattering, and the remoteness of the opposite terminal prevents formation of arcs. My device, therefore, is well adapted for directly controlling the heating circuit and preventing the formation of arcs therein. In practical use the device has been found to satisfactorily control a heating circuit of 120 volts with 8 to 20 amperes without sparking, and without displacement of the electric switch.

In the particular form in which my invention has been embodied the vessel A is adjustable in position and for this purpose it is mounted upon a threaded support $a$, which is received into a correspondingly threaded split post $b$. A knurled wheel $a^1$ is convenient for adjusting the vessel A in position. The opposite end of the vessel A preferably carries a post $a^2$. This engages an arm E which is supported upon an insulated block $e$ suitably attached to the frame as for instance by spring hinge $e^1$ and provides a connection whereby the motion of the thermostat may be transmitted to the switch arm. In the form in which my invention is illustrated the post $a^2$ rests against the arm E but is not attached to it; therefore the thermostat is adapted to move the said arm E in only one direction. For the purpose of moving the said arm E in the opposite direction and for holding the same at all times in position against the post $a^2$, I preferably attach a spiral spring $e^1$ to the said arm and the other end is attached to a post $e^2$ fixed to the frame. This spring is adjustable by being attached to a threaded screw $e^3$ whereby its tension may be varied as desired.

The switch member F is pivoted so as to swing to and fro and to make contact with contact points G and H, and these are illustrated as forming terminals for electric circuits. Attached to the said switch F is a spring $f$, and this spring is connected to the forward or free end of the said switch arm and at its opposite end is connected to a fixed point $f^1$ of the frame by an adjusting screw $f^7$. The said point of attachment $f^1$ is beyond the pivotal point of the switch arm, wherefore the spring $f$ has a longer radius of movement than the switch arm and will hold the same in position at either of the contact points G and H upon which it may rest. This is desirable when the said device is in use upon railway cars, as the constant vibration of the car is apt to cause an undesired movement of the said switch arm and this is resisted and prevented by the spring $f$.

The switch arm F has a slight spring motion tending to press its free end downward or toward the left in Fig. 2, whereby, when it is in engagement with either of the contact points G, H, such spring pressure will create a frictional resistance to movement of the switch tending to break such contact, and the effect of such resistance is increased by the leverage due to the increased length of the switch F over forks $f^3$. Therefore, when the said switch arm F is moved under the influence of the thermostat A the said frictional resistance will cause the said switch member, when said resistance is overcome, to be thrown with sufficient force to overcome the opposition of spring $f$ and to move the switch F until said spring $f$ is carried past its center, when it will pull the switch to the opposite contact, and this whole movement will be a quick snap that will prevent arcing. The resistance of switch F to its initial movement is important in the operation of the device, as it requires so much greater force to move the switch F against its resistance that when this resistance is suddenly removed by the switch passing from the contact point, the power moving the switch will be sufficient to suddenly throw it over its center with a quick snap when the spring $f$ will immediately supplement the actuating device and cause it to pass to the opposite contact point. Without the frictional resistance of the switch upon the contact point the movement of the switch arm would be gradual and it would have to be moved beyond its center point before spring $f$ could work, with consequent arcing. It will be observed that the spring $f$ opposes the tendency of the switch member F to occupy any intermediate position to which it may be pushed by the thermostat A, and causes the same, when moved away from one contact point, as for instance G, with a quick snap whereby the spring is carried beyond the center, to be immediately passed to the other contact point, as for instance H. Spring $f$ helps the movement of the switch after half its movement is completed. As clearly seen in Fig. 1, the line of pull from the points of attachment of spring $f$ at $f^1$ and $f^6$ lies outside of the pivot $f^2$.

The particular construction whereby the switch F is controlled by the thermostat A includes the arm E, as above described. The motion of this arm is communicated to the switch member F in the form illustrated by causing it to pass between the two members of a fork $f^3$, by which means, as the arm E is moved in one direction under the impulse of the thermostat A, the pivot $f^2$ will be turned carrying the switch F in the same direction, which, if the thermostat has expanded, will be into contact with the point H, which would usually open the circuit shutting off the supply of heat. If the thermostat A is contracted sufficiently to permit spring $e^1$ to retract arm E, the switch arm F would be moved into contact with contact point G. The parts of the switch F consist of the pivot $f^2$ on which is mounted a frame $f^4$. This frame at its lower end, in the construction illustrated, carries switch F and at its upper end carries an arm $f^5$, upon the upturned end $f^6$ of which is secured the spring $f$. As will be seen from Fig. 1, the arm $f^5$ is in the same vertical plane as the switch F and is employed merely for convenience, inasmuch as the spring $f$ could equally well be attached directly to the switch F but has been preferably attached to the arm $f^5$. The screw $f^7$ to which the spring $f$ is attached permits of its adjustment to vary the tension. It will be perceived that the forks $f^3$ and switch F constitute a lever fulcrumed at $f^2$, and that the resistance to the movement of the switch, being applied at the longer arm of the lever, is magnified and as more power in the actuating devices is required to overcome it, so the compression of the elastic actuating devices is increased and the power available upon the overcoming of the resistance is so much greater, and by reason of the elasticity of the actuating devices it is continuously applied to the movement of the switch.

The switch member F is connected in circuit by wire I which is attached to the binding post $i$ and is connected by wire $i^2$, as seen in dotted lines in Fig. 1, to a binding screw $i^3$, whereby the current is passed to the said switch F through the metallic frame $i^4$. Wire J leads to binding post connection $j$ and is connected to contact point G by wire $g$, as seen in dotted lines in Fig. 1. The other contact points H is connected to wire K through a connecting post $k$ by wire $h$, as seen in dotted lines in Fig. 1. The initial movement of the switch member, being that part of its movement which is retarded by its frictional engagement with a terminal, is less than half its throw and is intended not only to obtain a close contact between the switch and its terminal, but by compressing the elastic motor to cause the switch, as soon as it is out of contact with the terminal, to travel with accelerated movement away from the terminal. This result is accomplished by the increased effective energy of the motor when it has overcome the resistance of the switch to its initial movement away from a terminal and by the fact that the switch is moved by the motor throughout its entire throw, and during the last half of the throw the spring assists the motor.

The operation of my device is as follows: Assume the thermostat A to have been adjusted to expand at the desired temperature and to be in its contracted position when the switch F is in contact with the terminal G. In this position the heating circuit controlled by the switch F will be closed so that heat will be supplied to the apartment to be heated. The circuit will then be established through the switch member and its connections $i$, wire $i^2$, post $i^3$, and frame $i^4$ to the leading-in wire I and from the terminal G through wire $g$ to wire J. In this position the spring action of the switch F will be sufficient to cause it to press with considerable force upon the terminal G so that it will interpose a slight but sufficient resistance to the initial movement of the switch, by which I mean the movement taking the switch out of contact with the terminal. Thereupon, upon an increase of the temperature in the apartment so that it is desired to shut off the supply of heat, the operation will be as follows: The thermostatic vessel A will begin to expand and to press upon the arm E and this arm will begin to exert pressure upon the switch F to move the same away from contact with the terminal G through the forks $f^3$. The said switch F however, will resist movement, owing to its frictional engagement with the terminal G which is increased by such resistance being applied at the outer end of the switch F which is longer than the forks $f^3$ to which the power is applied, and to the tension of the springs $f$ and $e^1$. Owing to the compressibility and elasticity of the volatile fluid in the vessel A when the same is expanded, the resistance to the movement of the switch will compress the vessel A and the contained fluid. Continued expansion of the thermostat A will thereupon produce sufficient power to cause the switch F to be moved out of engagement with the terminal G. The sudden removal of the resistance interposed by the frictional engagement of the switch arm F with the terminal G will enable the energy of the thermostatic actuating devices to overcome the resistance of the springs and to throw the switch. This is increased by the energy stored therein by the compression thereof during the initial movement of the switch F. The elastic power of the thermostat will then be sufficient to move the switch F against the resistance of the springs $f$, $e^1$ past the center pull of the spring $f$ whereupon the said spring will supplement the action of the actuating devices in throwing the switch into contact with the other terminal H. The circuit will then be closed through the switch arm as before stated, and through the terminal H, wire $h$, connection $k$ and wire K to suitable devices whereby the supply of heat may be shut off. The thermostat A therefore, it will be seen, constitutes an elastic thermostatic motor and this may be aided if desired by spring action of the arm E which is illustrated as having a spring hinge.

The operation above described will move the switch arm into contact with terminal H in which position the circuit is open and the heating supply is shut off. When the apartment cools off and it is desired to again increase the heat supply, the thermostat A begins to contract and the pressure of the arm E upon it under tension of the spring $e^1$ causes the vessel A to be compressed sufficiently to place the elastic volatile liquid therein under tension. Thereupon the spring $e^1$ will retract the arm E as the resistance to the movement of said arm interposed by the expansible vessel A is diminished by the contraction thereof until it has succeeded in retracting the said arm E sufficiently to move the switch F out of contact with the terminal H. The frictional engagement of the switch with this terminal is the same as with the other and this frictional resistance being suddenly released the power of the spring $e^1$ is sufficient to overcome the resistance of spring $f$ and of the thermostat and to throw the switch with a quick decided snap past the center pull of the said spring $f$ whereupon the said spring $f$ will then lend its aid to the spring $e^1$ in continuing the movement of the switch to contact with terminal G, and these double spring forces will be sufficient to effect a desired compression of the expansible vessel A.

The frame $i^4$ is of metal, as is the pivot $f^2$, and these parts enable the circuit to be closed through the switch F. Stops $l$ $l$ are provided to limit the movement of the switch F in both directions, and these stops are so located as to stop the said switch when it is in position over the contact points G, H.

The foregoing presents a desirable form in which my invention may be embodied, and it is the best form now known to me. I do not desire to be limited, however, to the precise construction of the parts shown as the same may be changed in many respects within the limits of the appended claims.

The form of invention illustrated is particularly designed for use in controlling the electric switch of a heating circuit, and it is for this use that the contact points G H are each adapted to close a circuit. These contacts as illustrated form the terminals for the double branched electric circuit J K, as the switch referred to requires a double-branched circuit to operate it. It will be obvious, however, that for some classes of control but a single branched circuit is required and the requisite control is obtained by the making or breaking of this circuit by my invention. An instance of this kind is the automatic valve for a steam heating system illustrated in the application of E. E. Gold, filed May 16, 1913, and serially numbered 768,059, which is closed by the energization of the magnet against steam pressure and opened when the magnet is deënergized by the breaking of the circuit by the steam pressure plus spring pressure. A device of this kind, which controls a steam heating system, may be operated by the make or break of a single circuit. My device is applicable to such use without change, and if desired both contact points G and H may remain, but only one of them will be in circuit and will act as a terminal. The other one might be omitted without interfering with the operation of the switch, and if retained will simply exercise a frictional resistance to the initial operation of the switch above described.

The invention herein described is available not only for use in controlling heating systems, but may also be used to control ventilating apparatus or a refrigerating system or other apparatus which is controlled by the temperature of the apartment.

What I claim is:—

1. An automatic switch comprising a pivoted switch member, a terminal, means for interposing a frictional resistance to the initial movement of said switch member, a spring operatively connected to said switch member at one side of its pivot and to a fixed part of the device on the other side of said pivot, elastic thermostatic actuating means for said switch member comprising an expansible vessel having volatile fluid therein and affected by the temperature of the surrounding atmosphere, said vessel adapted to be restrained in its movement by said initial resistance whereby upon the completion of said initial movement, said switch member is moved by said actuating means with a sudden movement to its opposite position.

2. An automatic switch comprising a pivoted switch member, a pair of contacts, means for interposing a frictional resistance to the initial movement of said switch member, a spring operatively connected to said switch member at one side of its pivot and to a fixed part of the device on the other side of said pivot, elastic thermostatic actuating means for said switch member comprising an expansible vessel having volatile fluid therein and affected by the temperature of the surrounding atmosphere, said vessel adapted to be placed under compression in its movement by said initial resistance, a connection between said actuating means and said switch member comprising a bar spring mounted in operative relation to said actuating means whereby upon the completion of said initial movement, said switch member is moved by said actuating means with a sudden movement to the other contact.

3. An automatic switch comprising a pivoted switch member, a thermostatic actuating device for said switch member comprising an expansible vessel having a volatile fluid therein and affected by the temperature of the surrounding atmosphere, an operating bar for said switch member movably mounted adjacent said actuating device, and spring means for holding said bar and vessel in operative relation, a connection between said bar and said switch member adapted to amplify the movement of said bar, and a spring operatively connected to said switch member at one side of its pivot and to a fixed part at the other side of the pivot.

4. An automatic switch comprising a pivoted switch member, a pair of terminals, a thermostatic actuating device for said switch member comprising an expansible vessel having a volatile fluid therein and affected by the temperature of the surrounding atmosphere, an operating bar for said switch member movably mounted adjacent said actuating device, and spring means for holding said bar and vessel in operative relation, a connection between said bar and said switch member adapted to amplify the movement of said bar, a spring operatively connected to said switch member at one side of its pivot and to a fixed part at the other side of the pivot, and said switch member having frictional engagement with said terminals whereby a frictional resistance to the initial movement of said switch member exists.

5. An automatic controlling device for a switch comprising a movable operating bar, a pivoted spring switch member operatively connected to said bar, a terminal for said switch member, said switch member having sliding contact with said terminal and being adapted to bear with spring pressure thereon, whereby a frictional resistance to the initial movement of said switch member out of contact with said terminal is produced, an elastic thermostatic motor for moving said bar in one direction, and a spring for holding said bar in operating relation to said motor and moving it in the other direction, said motor and said spring each adapted to store up power when moving said switch member in its said initial movement under their respective powers.

6. An automatic controlling device for a switch comprising a movable operating bar, a pivoted spring switch member, a positive connection between said bar and said member for amplifying the movement of said bar, a terminal for said switch member, said switch member having sliding contact with said terminal and being adapted to bear with spring pressure thereon, whereby a frictional resistance to the initial movement of said switch member out of contact with said terminal is produced, a thermostatic elastic motor for moving said bar in one direction, and a spring for holding said bar in operating relation to said motor and moving it in the other direction, said motor and said spring each adapted to store up power when moving said switch member in its said initial movement under their respective powers.

7. An automatic controlling device for a switch comprising a movable operating bar, a pivoted spring switch member, a terminal for said switch member, said switch member having sliding contact with said terminal and being adapted to bear with spring pressure thereon, whereby a frictional resistance to the initial movement of said switch member out of contact with said terminal is produced, an amplifying connection between said bar and said switch, an elastic thermostatic motor for moving said bar in one direction, comprising an expansible vessel having a volatile fluid therein and affected by the temperature of the surrounding atmosphere, and a spring for holding said bar in operating relation to said motor and moving it in the other direction, said motor and said spring each adapted to store up power when moving said switch member in its said initial movement under their respective powers.

8. An automatic controlling device for a heating system comprising an elastic thermostatic motor affected by the temperature of the surrounding atmosphere, a switch member and a direct connection for moving the same from said motor, a contact for said switch, said switch member bearing with spring pressure on said contact, whereby a frictional resistance to the initial movement of the switch member is created and the load on said motor is increased while it is moving said switch member out of connection with said contact and said motor is put under tension during such movement and by means whereof upon said switch member passing out of connection with said contact, the effective power of said motor is increased and said switch member is moved by said motor with a sudden snap to its other position.

9. An automatic controlling device for a heating system comprising an elastic thermostatic motor affected by the temperature of the surrounding atmosphere, a switch member and an inflexible amplifying connection for controlling the same from said motor, a pair of widely separated terminals for said switch, means for resisting the movement of said switch member while it is in contact with either of said terminals, a spring connected to said switch member and to a fixed part of the device and adapted to move the same toward either terminal from a substantially central position and to resist the initial movement of said switch, whereby upon reduction in the load on the motor consequent upon the switch member being moved out of contact with a terminal, said motor moves the switch member with a sudden quick snap past the resisting point of said spring, and thereupon the further movement of said switch is assisted by said spring.

10. In a device of the character described, a pivoted switch member, a terminal therefor, said switch member making a sliding contact with said terminal and bearing with spring pressure thereon, whereby a resistance to the initial movement of said switch member is created, thermostatic elastic actuating means and an operating connection therefrom to said switch member, a spring connected to the said switch member at one side of its pivot and to a fixed part of the device at the other side of the pivot of said switch member and independent of said actuating means and adapted to resist the initial movement of said switch member and to assist its final movement.

11. In a device of the character described, a pivoted spring switch member, a pair of terminals therefor, said switch member adapted to bear with spring pressure upon the terminal with which it may be in contact and to resist a force tending to move it away from said terminal, elastic thermostatic actuating means for the switch adapted by reason of its elasticity to store up power while overcoming the resistance of the switch to movement out of contact with a terminal, an inflexible connection between the switch member and its actuating means for increasing the movement of said switch beyond that of the actuating means and for increasing the effect upon the actuating means of the resistance of said switch to initial movement, said actuating means adapted to throw said switch with accelerated movement to the limit of its travel when it has passed out of contact with a terminal.

In witness whereof, I have hereunto signed my name in the presence of two subscribing witnesses.

FREDERICK T. KITCHEN.

Witnesses:
HENRY M. TURK,
C. FRED WHITE.

---

It is hereby certified that in Letters Patent No. 1,214,323, granted January 30, 1917, upon the application of Frederick T. Kitchen, of West New Brighton, New York, for an improvement in "Controllers for Heating Systems," an error appears in the printed specification requiring correction as follows: Page 1, line 104, for the word "arms" read *arcs*; and that the said Letters Patent should be read with this correction therein that the same may conform to the record of the case in the Patent Office.

Signed and sealed this 5th day of February, A. D., 1918.

[SEAL.]

R. F. WHITEHEAD,
*Acting Commissioner of Patents.*

Cl. 200—32.